(12) United States Patent
Chiang

(10) Patent No.: US 7,923,086 B2
(45) Date of Patent: Apr. 12, 2011

(54) HOUSING AND SURFACE TREATING METHOD FOR MAKING THE SAME

(75) Inventor: Chwan-Hwa Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 595 days.

(21) Appl. No.: 11/966,969

(22) Filed: Dec. 28, 2007

(65) Prior Publication Data

US 2009/0110852 A1    Apr. 30, 2009

(30) Foreign Application Priority Data

Oct. 25, 2007    (CN) .......................... 2007 1 0202270

(51) Int. Cl.
B29D 22/00    (2006.01)
B29D 23/00    (2006.01)
B32B 1/08    (2006.01)

(52) U.S. Cl. .................... 428/35.7; 428/35.8; 428/35.9; 428/76; 428/77; 455/575.8; 455/575.1; 379/428.01

(58) Field of Classification Search ................. 428/35.7, 428/35.8, 35.9, 76, 77; 455/575.8, 575.1; 379/428.01
See application file for complete search history.

(56) References Cited

U.S. PATENT DOCUMENTS

2004/0086728 A1 *    5/2004    Maruoka et al. .............. 428/447

FOREIGN PATENT DOCUMENTS

| CN | 2526896 Y | 12/2002 |
| CN | 1411982 A | 4/2003 |
| JP | 2001315162 A * | 11/2001 |
| JP | 2007138257 | * 6/2004 |

* cited by examiner

Primary Examiner — Michael C Miggins
(74) Attorney, Agent, or Firm — Frank R. Niranjan

(57) ABSTRACT

An exemplary housing includes a main body, and a plurality of coatings formed on the main body. The coatings include a plating layer, an outer layer, and an adhesive layer. The plating layer is coated on the main body. The adhesive layer is sandwiched between the plating layer and the outer layer. Surface treating methods for making present housing are also provided.

9 Claims, 2 Drawing Sheets

US 7,923,086 B2

HOUSING AND SURFACE TREATING METHOD FOR MAKING THE SAME

This application is related to two co-pending U.S. patent applications, which are: application Ser. No. [to be determined], and both entitled "HOUSING AND SURFACE TREATING METHOD FOR MAKING THE SAME". In all these co-pending applications, the inventor is Chwan-Hwa Chiang. All of the co-pending applications have the same assignee as the present application. The disclosures of the above identified applications are incorporated herein by reference.

BACKGROUND OF THE INVENTION

1. Field of the Invention

The present invention generally relates to housings, and particularly, to a housing used in electronic devices, and a surface treating method for making the housing.

2. Discussion of the Related Art

In recent years, there has been an increase in demand for portable electronic devices, such as personal digital assistants (PDAs), mobile phones, MP3 players and MP4 players. To make the portable electronic devices more physically appealing, the housings of the portable electronic devices may be decorated to have different appearances.

Generally, housings that exhibit different appearances are done by layers of coating. A typical method for making a housing having metallic appearances includes the following steps: first, coating a primer onto a surface of a plastic board to form a bottom layer; second, depositing a metallic layer on the bottom layer by vacuum metallization.

However, the metallic layer formed by vacuum metallization has relatively high chemical activity, thus metallic layer is prone to being oxidized or corroded. Thus, the appearance of the housing may be compromised.

To prevent the metallic layer from being oxidized or corroded, generally a transparent layer is coated on the metallic layer to form an outer layer. The outer layer may protect the metallic layer to a certain extent and for a certain time. However, the outer transparent layer would, eventually, peel off from the metallic layer, leaving the metallic layer exposed to oxidation or corrosion.

Therefore, a new housing and surface treating methods for making the housing are desired in order to overcome the above-described shortcomings.

SUMMARY

A housing includes a main body, and a plurality of coatings formed on the main body. The coatings include a plating layer, an outer layer, and an adhesive layer. The plating layer is coated on the main body. The adhesive layer is sandwiched between the plating layer and the outer layer.

A surface treating method for making a housing having a main body, includes: forming a plating layer on a main body; coating an adhesive on the plating layer to form an adhesive layer; and coating a lacquer on the adhesive layer to form an outer layer.

Another surface treating method for making a housing having a main body, includes: coating a primer on a main body to form a bottom layer; forming a plating layer on the bottom layer; coating an adhesive on the plating layer to form an adhesive layer; and coating a lacquer on the adhesive layer to form a outer layer.

Other novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present housing and surface treating methods for making the housing. Moreover, in the drawings, like reference numerals designate corresponding parts throughout several views, and all the views are schematic.

DETAILED DESCRIPTION OF THE EMBODIMENTS

Reference will now be made to the drawings to describe preferred embodiments of the present housing and surface treating method for making the housing in detail.

Figure 1:
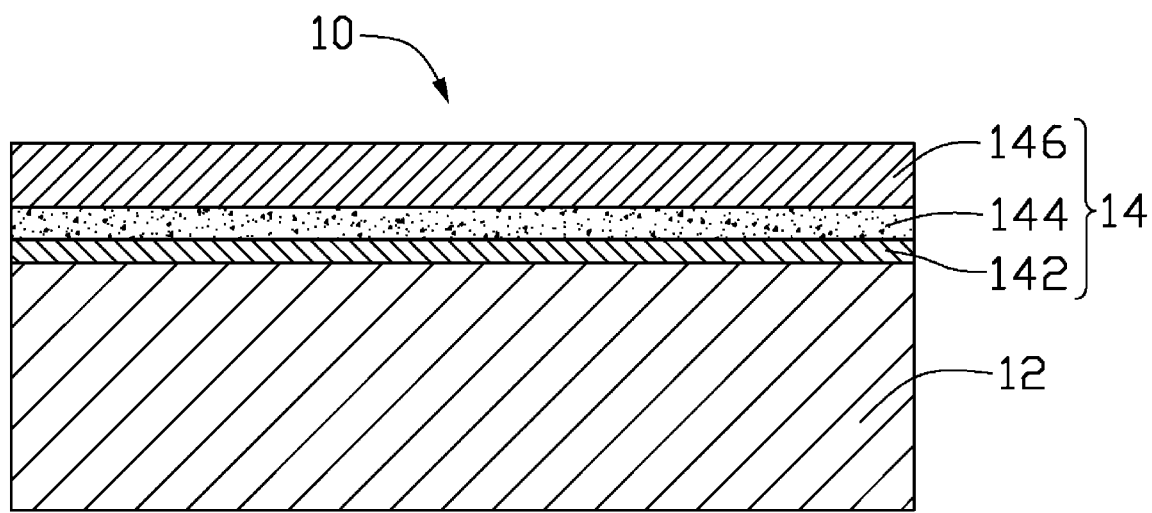
FIG. 1 is a side, cross-sectional view of a housing in accordance with a first preferred embodiment of the present invention.

Referring to FIG. 1, a housing 10 according to a first embodiment is shown. The housing 10 may be used for a portable electronic device, such as a mobile phone. The housing 10 includes a main body 12 and a plurality of coatings 14 formed on the main body 12. The coatings 14 include a plating layer 142, an adhesive layer 144, and an outer layer 146. The plating layer 142 connects to the main body 12. The adhesive layer 144 is applied on the plating layer 142 for connecting the outer layer 146 to the plating layer 142. A thickness of the plating layer 142 is preferably in a range from about 0.01 microns to about 10 microns. A thickness of the adhesive layer 144 is preferably in a range from about 1 micron to about 20 microns. A thickness of the outer layer 146 is preferably in a range from about 10 microns to about 80 microns.

A material of the main body 12 is selected from the group consisting of glass, ceramic, polycarbonate, acrylonitrile-butadiene-styrene copolymer, polymethyl methacrylate, composition of glass fiber and nylon, and any suitable combination thereof. Furthermore, to improve physical attractiveness of the housing 10, an outer surface of the main body 12 is, preferably, smooth.

The plating layer 142 can be either electrically insulative or electrically conductive. A material of the plating layer 142 may be selected from the group consisting of stannum, aluminum, silicon-aluminum alloy, titanium, titanium carbide, titanium nitride, cadmium, indium, silicon dioxide, stainless steel, and any suitable combination thereof.

A material of the adhesive layer 144 is made of a polyolefin chloride, such as polyvinyl chloride and polypropylene chloride. In alternative embodiments, the adhesive layer 144 includes polyolefin chloride in an amount by weight from about 1% to about 99% and some additive materials. The additive material can be a polymer having one of a hydroxyl, amidogen, carboxyl, and epoxy group.

A material of the outer layer 146 includes acrylic resin.

An exemplary surface treating method for making the housing 10 is as follows. First, the plating layer 142 is formed on the main body 12. Second, an adhesive is coated on the plating layer 142 to form an adhesive layer 144 on the plating layer 142. Third, a lacquer is coated on adhesive layer 144 to form an outer layer 146.

The process of forming the plating layer 142 can be done by performing a physical vapor deposition (PVD), a non-conductive vacuum metallization (NCVM) or a chemical vapor deposition (CVD) method. If the physical vapor deposition (PVD) or the non-conductive vacuum metallization method is used to prepare the plating layer 142, a plating material for the plating layer 142 may be a material selected from the group consisting of stannum, aluminum, silicon-aluminum alloy, titanium, titanium carbide, titanium nitride, cadmium, indium, silicon dioxide, stainless steel, and any suitable combination thereof. Excitation of the plating material may be performed by magneto-controlled sputter or plasma sputter. It should be pointed out that, if deposition is performed by the non-conductive vacuum metallization method, the plating layer 142 is electrically insulative.

The step of coating the adhesive is performed under a suitable temperature, such as normal temperature (20° C.). The adhesive is made of a polyolefin chloride, such as polyvinyl chloride and polypropylene chloride. In alternative embodiments, the adhesive layer 144 includes polyolefin chloride in an amount by weight from about 1% to about 99% and some additive materials. The additive material can be a polymer having one of a hydroxyl, amidogen, carboxyl, and epoxy group.

The step of coating the lacquer is performed by spraying or brush coating. The lacquer can be a transparent lacquer or a color lacquer. The lacquer can include acrylic resin. After coating on the adhesive layer 144, the lacquer may further be leveled and solidified. The process of solidifying the lacquer is performed by a thermal curing method or a light curing method. For example, if the lacquer is an ultraviolet-cured lacquer, the process of solidifying the lacquer is preferably performed by a ultraviolet curing method.

The adhesive layer 144 increases a bonding strength between the plating layer 142 and the outer layer 146. Thus, the adhesive layer 144 prevents the outer layer 146 from detaching off the housing 10. Furthermore, the plating layer 142 is not easily to be damaged, and an appearance of the portable electronic device using the housing 10 is improved.

In this embodiment, the material of the adhesive layer 144 includes polyolefin chloride. Chlorine atoms of the adhesive layer 144 and metal atoms of the plating layer 142 would form chemical bonds, thereby enhancing the bonding strength of the plating layer 142 and the adhesive layer 144. Polymer chain of the adhesive layer 144 would combine with polymer chain of the outer layer 146, thereby enhancing the bonding strength of the adhesive layer 144 and the outer layer 146. Thus the outer layer 146 is tightly bonded on the housing 10. In addition, the outer layer 146 includes acrylic resin. Acrylic resin has elasticity, thereby making the outer layer 146 soft and comfortable when touched.

Furthermore, in the process of surface treating the housing 10, it easy to use various plating material to deposited the plating layer 142 or change the color of the lacquer for forming the outer layer 146. Therefore, the appearance of the housing 10 may meet different needs of the portable electronic device. In addition, if the plating layer 142 is deposited by the non-conductive vacuum metallization method, the plating layer 142 is electrically insulative. Thus the plating layer 142 would not interfere with electromagnetic waves or electrostatic discharge.

Figure 2:
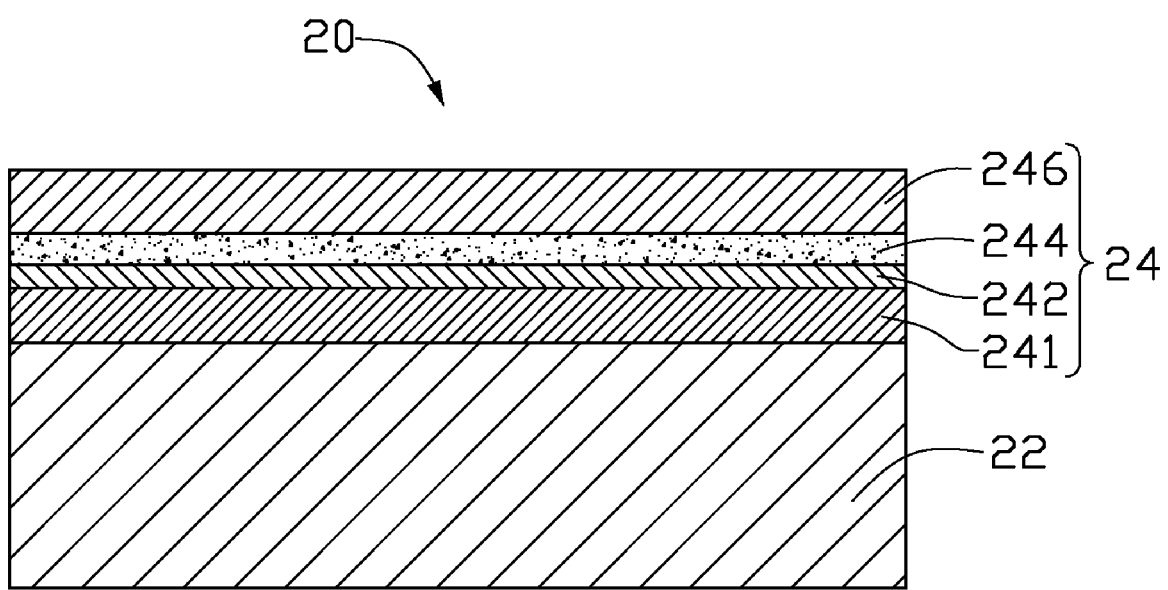
FIG. 2 is a side, cross-sectional view of a housing in accordance with a second preferred embodiment of the present invention.

Referring to FIG. 2, a housing 20 according to a second embodiment is shown. The housing 20 includes a main body 22 and a plurality of coatings 24 formed on the main body 22. The coatings 24 include a plating layer 242, an adhesive layer 244, and an outer layer 246. The housing 20 is similar in principle to the housing 10, however, the coatings 24 further includes a bottom layer 241. The bottom layer 241 is formed on the main body 22, and connects to the plating layer 242. A thickness of the bottom layer 241 is preferably in a range from about 1 micron to about 30 microns. A surface treating method for making the housing 20 includes the following steps: first, coating a primer on a main body, then leveling and solidifying the primer, thereby forming the bottom layer 241; second, forming the plating layer 242 on the bottom layer 241; third, coating an adhesive on the plating layer 242 to form an adhesive layer 244; finally, coating a lacquer on the adhesive layer 244 to form the outer layer 246. The primer may include acrylic resin. The process of solidifying the primer can be done by performing a thermal curing method or a light curing method. It should be understood that, with the help of the bottom layer 241, an appearance of the housing 20 can be improved, even if a surface of the main body 22 that connects to the bottom layer 241 is zigzag.

It is noted that the scope of the present housing and surface treating method is not limited to the embodiments described above. In alternative embodiments, the portable electronic device can be a personal digital assistant, a MP3 player, or a MP4 player. The housings can also be utilized in some devices other than the portable electronic devices, such as a table computer. In addition, the surface treating method may be used for a workpiece other than the housing.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A housing comprising:
   a main body; and
   a plurality of coatings formed on the main body, the coatings comprising:
     a plating layer deposited on the main body;
     an outer layer; and
     an adhesive layer sandwiched between the plating layer and the outer layer, wherein a material of the plating layer is selected from the group consisting of tin, aluminum, silicon-aluminum alloy, titanium, titanium carbide, titanium nitride, cadmium, indium, silicon dioxide, stainless steel, and any combination thereof, a material of the adhesive layer comprises polyolefin chloride, and a material of the outer layer comprises acrylic resin.

2. The housing as claimed in claim 1, wherein a material of the main body is selected from the group consisting of glass, ceramic, polycarbonate, acrylonitrile-butadiene-styrene copolymer, polymethyl methacrylate, composition of glass fiber and nylon, and any combination thereof.

3. The housing as claimed in claim 1, wherein the material of the adhesive layer further comprises a polymer having one of a hydroxyl, amidogen, carboxyl and epoxy group.

4. The housing as claimed in claim 1, wherein a thickness of the adhesive layer is in a range from about 1 micron to about 20 microns.

5. The housing as claimed in claim 1, wherein the plating layer is electrically insulative.

6. The housing as claimed in claim 1, wherein a thickness of the plating layer is in a range from about 0.01 microns to about 10 microns.

7. The housing as claimed in claim 1, wherein a thickness of the outer layer is in a range from about 10 microns to about 80 microns.

8. The housing as claimed in claim 1, wherein the coating further comprises a bottom layer, and the bottom layer is located between the main body and the plating layer.

9. The housing as claimed in claim 8, wherein a thickness of the bottom layer is in a range from about 1 micron to about 30 microns.

* * * * *